US009254763B2

(12) United States Patent
Shimizu et al.

(10) Patent No.: US 9,254,763 B2
(45) Date of Patent: Feb. 9, 2016

(54) VEHICLE SEAT (71) Applicant: TS TECH CO., LTD., Asaka-shi, Saitama (JP)

(72) Inventors: Shuichi Shimizu, Tochigi (JP); Yuichiro Seki, Tochigi (JP); Satoshi Fujita, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 14/366,805

(22) PCT Filed: Dec. 18, 2012

(86) PCT No.: PCT/JP2012/082815
§ 371 (c)(1),
(2) Date: Jun. 19, 2014

(87) PCT Pub. No.: WO2013/099705
PCT Pub. Date: Jul. 4, 2013

(65) Prior Publication Data
US 2014/0312674 A1 Oct. 23, 2014

(30) Foreign Application Priority Data
Dec. 26, 2011 (JP) ................................. 2011-284508

(51) Int. Cl.
*A47C 7/02* (2006.01)
*B60N 2/42* (2006.01)
(Continued)

(52) U.S. Cl.
CPC .............. *B60N 2/4228* (2013.01); *B60N 2/427* (2013.01); *B60N 2/42727* (2013.01); *B60N 2/7094* (2013.01)

(58) Field of Classification Search
CPC .......................... B60N 2/42745; B60N 2/4228
USPC ............. 297/452.53, 452.54, 452.37, 452.32, 297/452.35, 216.14
See application file for complete search history.

(56) References Cited

U.S. PATENT DOCUMENTS 3,669,498 A * 6/1972 Meyers et al. ............ 297/452.53
4,747,638 A * 5/1988 Saito ......................... 297/452.62
(Continued)

FOREIGN PATENT DOCUMENTS

EP           407361 A1 * 1/1991 ............... A47C 7/18
JP      10-181400          7/1998
(Continued)

OTHER PUBLICATIONS

Office Action issued in counterpart Chinese Patent Application No. 201280064733.0 on Aug. 31, 2015, and corresponding English translation.

*Primary Examiner* — Laurie Cranmer
(74) *Attorney, Agent, or Firm* — Hamre, Schumann, Mueller & Larson, P.C.

(57) ABSTRACT

A vehicle seat (car seat (S)) includes a seat cushion (S1), a seat back (S2), and a headrest (S3), the seat back (S2) including a seat back frame constituting a frame of the seat back (S2), and a seat back pad covering the seat back frame, and the vehicle seat being configured to allow an upper body of an occupant to sink into the seat back (S2) when a backward movement load acts on the seat back from the occupant's upper body. The seat back pad includes a center portion (51) configured to face a back region of the occupant's upper body, and right and left side portions (52) provided at right and left sides of the center portion (51) and each configured to protrude frontward farther than the center portion (51), and each of the right and left side portions has an upper side portion (52A) corresponding to a height of a chest region of the occupant and a lower side portion (52B) corresponding to a height of a lumbar region of the occupant, which are configured such that when they receive the backward movement load, the upper side portion (52A) is more easily deformable than the lower side portion (52B).

7 Claims, 9 Drawing Sheets

(51) Int. Cl.
*B60N 2/70* (2006.01)
*B60N 2/427* (2006.01)

(56) References Cited

U.S. PATENT DOCUMENTS

| | | | |
|---|---|---|---|
| 5,129,707 A * | 7/1992 | Yamauchi | 297/216.14 |
| 5,316,375 A * | 5/1994 | Breen | 297/452.34 |
| 8,668,263 B2 * | 3/2014 | Takayasu et al. | 297/216.12 |
| 8,714,654 B2 * | 5/2014 | Nitsuma | 297/452.35 |
| 2011/0057492 A1 * | 3/2011 | Nakamura et al. | 297/301.4 |
| 2011/0204693 A1 | 8/2011 | Nitsuma | |
| 2011/0241394 A1 * | 10/2011 | Yamaguchi et al. | 297/216.14 |
| 2013/0119724 A1 * | 5/2013 | Adachi et al. | 297/216.14 |

FOREIGN PATENT DOCUMENTS

| | | |
|---|---|---|
| JP | 11-34707 | 2/1999 |
| JP | 3201591 | 8/2001 |
| JP | 2008-295690 | 12/2008 |
| JP | 2009-66128 | 4/2009 |
| JP | 2010-083268 | 4/2010 |
| JP | 2010-83269 | 4/2010 |
| JP | 2011-116341 | 6/2011 |

* cited by examiner

VEHICLE SEAT

TECHNICAL FIELD

The present invention relates to a vehicle seat comprising a seat cushion, a seat back, and a headrest.

BACKGROUND ART

Conventionally, there is known a vehicle seat in which when a rear-end collision occurs, an upper body of an occupant which would move backward due to inertia, is caused to sink into the seat back to let the head of the occupant move closer to the headrest, so as to reduce impact applied to the neck of the occupant (see Patent Literature 1).

CITATION LIST

Patent Literature

Patent Literature 1: Japanese Laid-open Patent Application, Publication No. 2010-083268

SUMMARY OF THE INVENTION

Technical Problem

Since the seat back includes a center portion facing a back region of the occupant's upper body, and right and left bulging portions provided at both sides of the center portion and protruding frontward farther than the center portion, the upper body (e.g., shoulders) of the occupant which would move backward will first hit these bulging portions. Accordingly, when a backward movement load acts on the seat back, the occupant's upper body, especially the upper part of the upper body is less likely to sink into the seat back.

The present invention has been made in view of the above background, and it is an object of the present invention to provide a vehicle seat in which it is ensured that the upper part of the occupant's upper body can sufficiently sink into the seat back when a backward movement load acts on the seat back.

It is a second object of the present invention to provide a vehicle seat which can stably support the occupant.

It is a third object of the present invention to provide a vehicle seat which can be provided with a sufficient space for allowing the seat back pad to deform.

It is a fourth object of the present invention to provide a vehicle seat which can prevent interference with a seat back frame when the upper part of the occupant's upper body sinks into the seat back.

It is a fifth object of the present invention to provide a vehicle seat which can simplify the structure and prevent an increase in the number of parts.

Solution to Problem

To achieve the above object, a vehicle seat according to the present invention comprises: a seat cushion, a seat back, and a headrest, the seat back including a seat back frame constituting a frame of the seat back and a seat back pad covering the seat back frame, and the vehicle seat being configured to allow an upper body of an occupant to sink into the seat back when a backward movement load acts on the seat back from the occupant's upper body, wherein the seat back pad comprising a center portion configured to face a back region of the occupant's upper body, and right and left side portions provided at right and left sides of the center portion and each configured to protrude frontward farther than the center portion, and wherein each of the right and left side portions has an upper side portion corresponding to a height of a chest region of the occupant and a lower side portion corresponding to a height of a lumbar region of the occupant, which are configured such that when they receive the backward movement load, the upper side portion is more easily deformable than the lower side portion.

With this configuration, each of the right and left side portions has the upper side portion which is configured to be more easily deformable than the lower side portion when they receive a backward movement load, so that when the backward movement load acts on the seat back, it is ensured that the upper part of the occupant's upper body (i.e., portion corresponding to the height of the occupant's chest region) can sufficiently sink into the seat back. This can cause the head of the occupant to more quickly move closer to the headrest, with the result that the impact applied to the neck of the occupant can be reduced further.

The above vehicle seat may further comprise support members provided in the seat back and configured to support the upper side portions from inside the seat back and to be movable in a backward direction.

With this configuration, since the vehicle seat includes the support members which support the upper side portions from inside the seat back, the support members can stably support the occupant in the normal condition, and once the backward movement load acts on the seat back, the upper part of the occupant's upper body can sufficiently sink into the seat back.

In the above vehicle seat, front surfaces of the support members may be disposed in contact with the seat back pad.

With this configuration, since the front surfaces of the support members are disposed in contact with the seat back pad, the occupant can be more stably supported by the support members in the normal condition.

In the above vehicle seat provided with the support members, the support members may be disposed frontward of the right and left side frames of the seat back frame with a gap provided between each of the side frames and each of the support members.

With this configuration, since the support members and the side frames are arranged with gaps provided between them, there is a sufficient space for allowing the seat back pad to deform when the upper side portions (seat back pad) deform by the action of the backward movement load. Accordingly, the seat back pad can deform further by the action of the backward movement load.

In the above vehicle seat, each support member may have a relief portion for preventing interference with the side frame, at a position facing the side frame.

With this configuration, since each support member has a relief portion for preventing interference with the side frame, interference of the support members with the side frames which would occur when the seat back pad deforms by the action of the backward movement load can be prevented. Further, an occurrence of interference noise can be prevented because the interference between the support members and the side frames are prevented.

The above vehicle seat provided with the support members may further comprises a pressure-receiving member disposed in the seat back at a position opposite to the center portion and connected to the right and left side frames of the seat back frame via a connecting member so as to allow the pressure-receiving member to move backward, wherein the support members are integrally formed with the pressure-receiving member such that they extend outward in a right-left direction from upper portions of right and left ends of the pressure-receiving member.

With this configuration, the support members and the pressure-receiving member are integrally formed, which can simplify the configuration of the vehicle seat and prevent an increase in the number of parts.

In the above vehicle seat provided with the support members, as viewed from front, the seat back pad may have through-openings or recessed portions at positions where regions between the center portion and the right and left side portions overlap the support members.

Since this configuration makes the upper side portions more easily deformable, the upper part of the occupant's upper body sinks more sufficiently into the seat back by the action of the backward movement load.

In the above vehicle seat in which the front surfaces of the support members are disposed in contact with the seat back pad, the support members may be configured to urge the upper side portions in a frontward direction.

This configuration makes it possible to stably support the occupant in the normal condition as well as to prevent a gap which would otherwise be formed between the support members and the seat back pad due to manufacturing error or the like. Further, this configuration causes the support members to quickly deform in accordance with the deformation of the seat back pad when the backward movement load acts on the seat back.

DESCRIPTION OF EMBODIMENTS

One embodiment of the present invention will be described in detail with reference to the drawings, where necessary.

Figure 1:
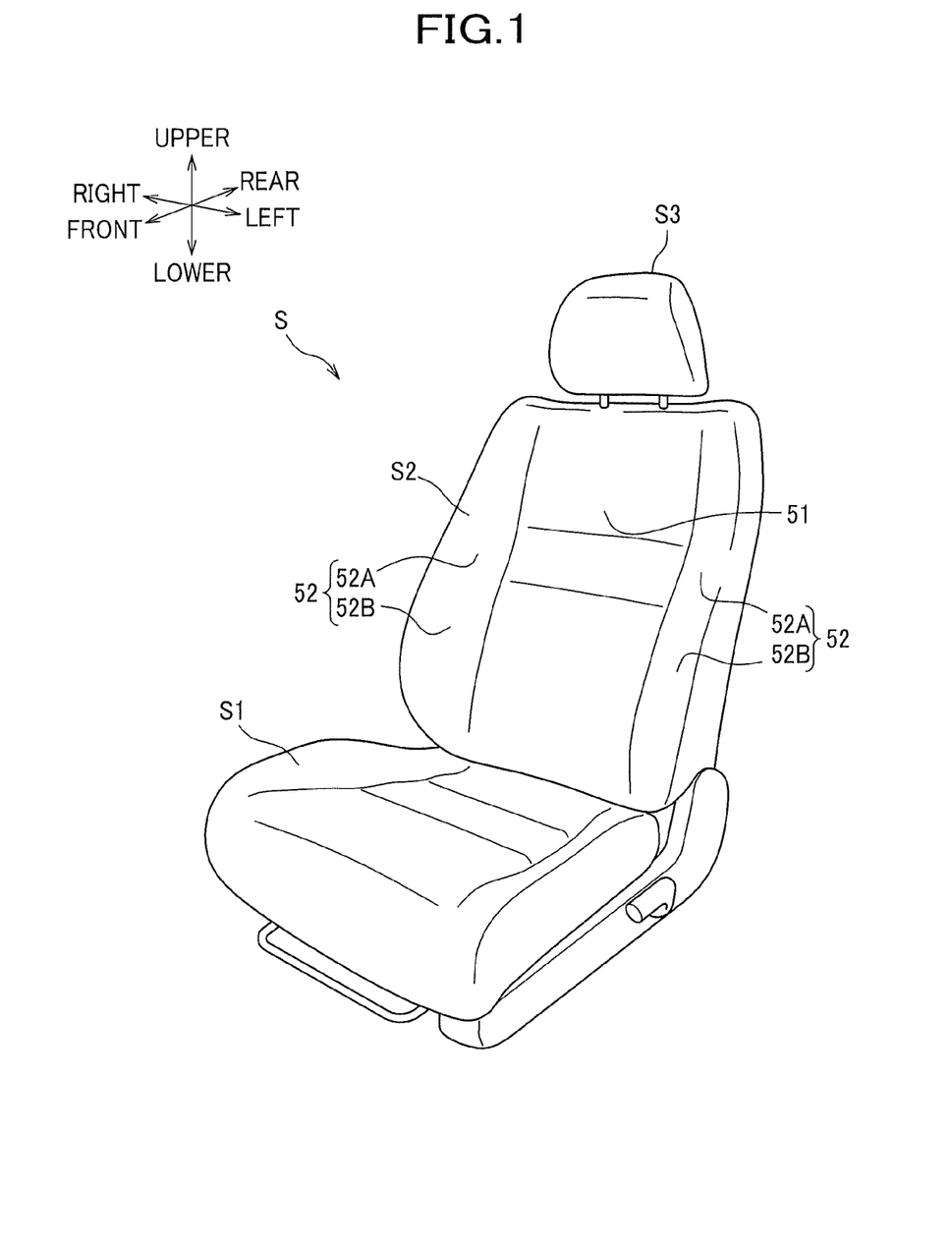
FIG. 1 is a perspective view of a car seat as a vehicle seat according to one embodiment of the present invention.

As seen in FIG. 1, a vehicle seat according to one embodiment of the present invention is configured as a car seat S used for a driver's seat of a car, and mainly includes a seat cushion S1, a seat back S2, and a headrest S3. As will hereinafter be described in detail, the car seat S is configured such that the upper body of an occupant sinks into the seat back S2 when the car is rear-ended by another car or when the car collides at its rear portion with another vehicle or a structural object while reversing, and a backward movement load acts on the seat back S2 from the upper body of the occupant.

Figure 2:
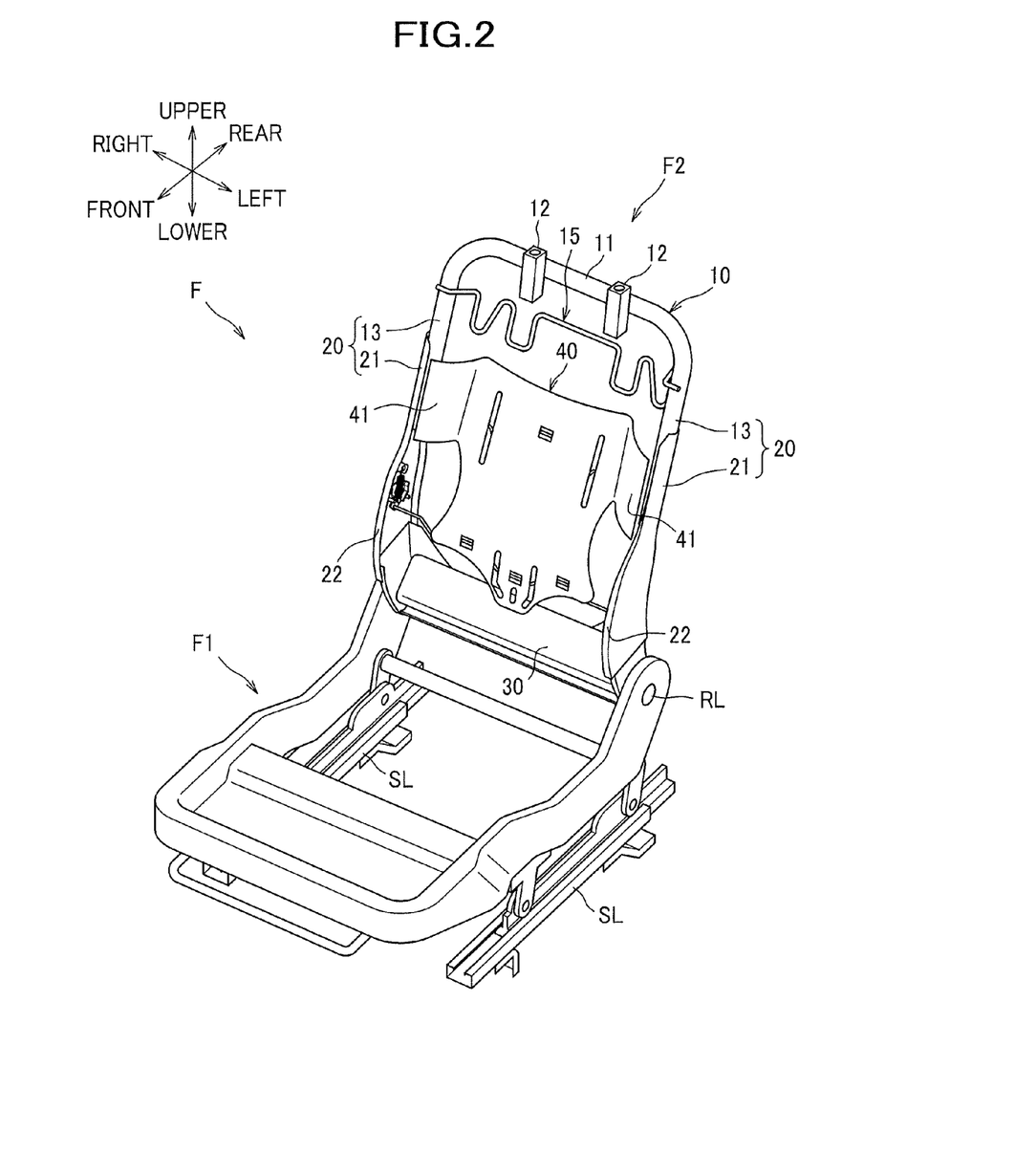
FIG. 2 is a perspective view of a seat frame embedded in the car seat.

A seat frame F as shown in FIG. 2 is embedded in the seat cushion S1 and the seat back S2. The seat frame F mainly includes a seat cushion frame F1 constituting a frame of the seat cushion S1, and a seat back frame F2 constituting a frame of the seat back S2. The seat cushion S1 is configured such that the seat cushion frame F1 is covered with a seat cushion pad made of a cushion material such as urethane foam, and a skin material made of synthetic leather or fabric. The seat back S2 is configured such that the seat back frame F2 is covered with seat back pad 50 made of a cushion material, and a skin material 60 (see FIGS. 4 and 6).

The seat cushion frame F1 is installed on a floor of the car via slide rails SL. Accordingly, the position of the car seat S is adjustable in the front-back direction. A lower portion of the seat back frame F2 is rotatably connected to a rear portion of the seat cushion frame F1 via a reclining mechanism RL. Accordingly, the seat back S2 is tiltable in the front-back direction with respect to the seat cushion S1.

In this specification, the front/back (frontward/backward), right/left (lateral), and upper/lower directions are designated as from the view point of an occupant seated on the car seat S without tilting down the seat back S2 by the reclining mechanism RL.

Figure 3:
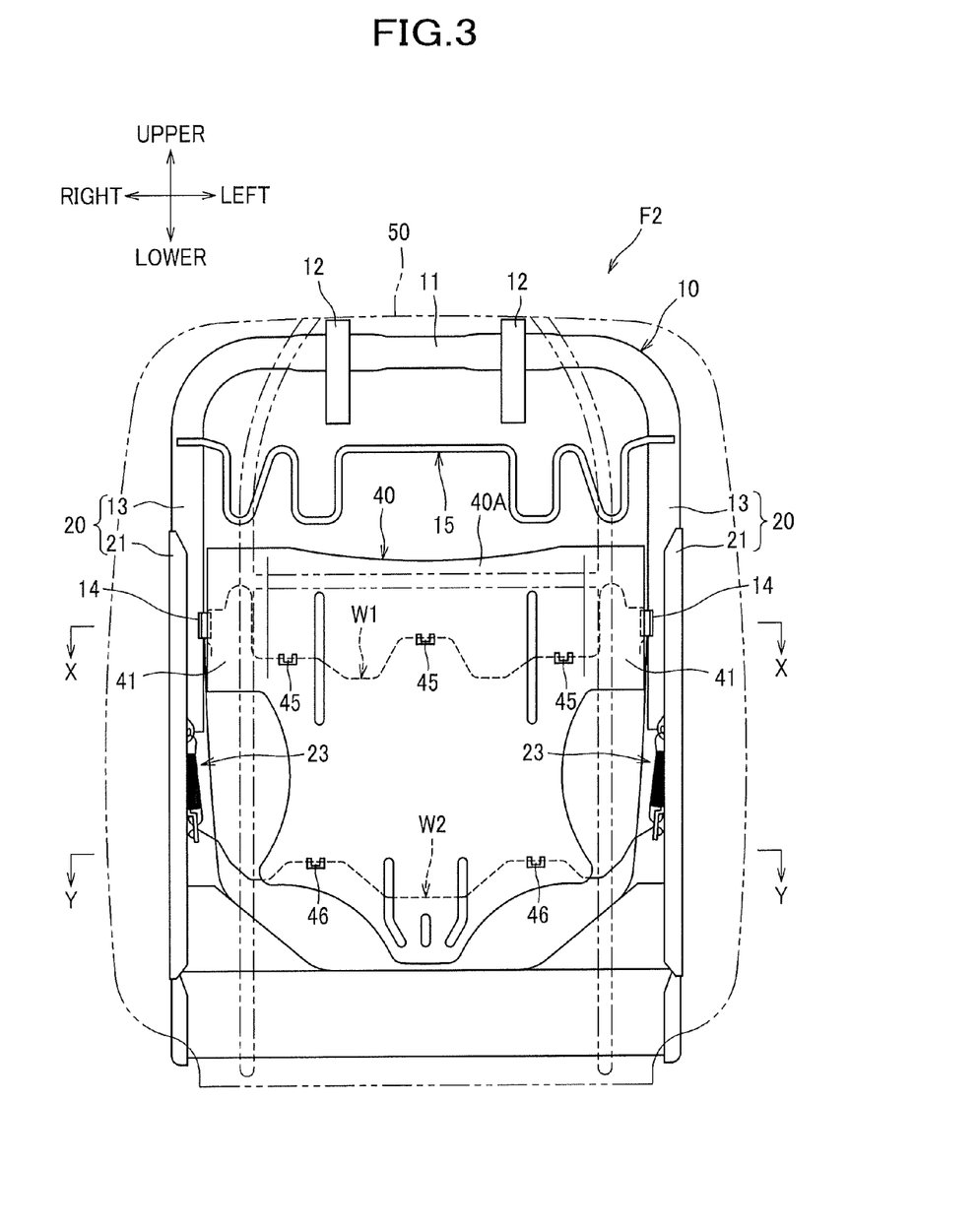
FIG. 3 is a front view of a seat back frame which constitutes the seat frame.

The seat back frame F2 mainly consists of an upper frame 10, right and left side frames 20, and a lower frame 30; the upper frame 10, the right and left side frames 20, and the lower frame 30 are joined together, for example, by welding to thereby form a frame-like configuration. A pressure-receiving member 40 is disposed inside this frame-like seat back frame F2; the pressure-receiving member 40 supports the upper body of the occupant so as to be movable in the backward direction.

The upper frame 10 is formed by bending a pipe material into a substantially U-shape configuration and includes a lateral pipe portion 11 extending in the right-left direction, and a pair of right and left support brackets 12 for attachment of the headrest S3 are fixed by welding to the front side of the lateral pipe portion 11. Right and left vertical pipe portions 13 of the upper frame 10 extend in the upper-lower direction; right and left side frame main body portions 21 are joined to lower portions of the vertical pipe portions 13 and made into integral parts to thereby form the right and left side frames 20.

Each of the side frame main body portions 21 is made by press working sheet metal to have a substantially U-shaped cross section; the side frame main body portions 21 are arranged laterally opposite to each other. The side frame main body portion 21 is connected to the vertical pipe portion 13 with its upper portion holding the vertical pipe portion 13, and the lower portion of the side frame main body portion 21 protrudes frontward farther than the upper portion of the side frame main body portion 21 to form a bulging portion 22.

The pressure-receiving member 40 is a plate-like member, for example, made of plastic resin, and as seen in FIG. 3, the pressure-receiving member 40 is connected to the right and left side frames 20 via an upper connecting wire W1 and a lower connecting wire W2 as an example of connecting members, so as to be movable in the backward direction. To be more specific, the upper connecting wire W1 is engaged with engagement portions 45 formed at an upper portion of the back side of the pressure-receiving member 40, and both right and left ends of the upper connecting wire W1 are bent to form upwardly protruding portions, each of which is engaged with a supporting tab 14 fixed to the vertical pipe portions 13, so that the upper portion of the pressure-receiving member 40 is connected to the right and left side frames 20. The lower connecting wire W2 is engaged with engagement portions 46 formed at a lower portion of the back side of the pressure-receiving member 40, and both right and left end portions of the lower connecting wire W2 are engaged with link members 23, which are fixed to the inner surfaces of the side frame main body portions 21 and configured to be swingable in the backward direction, so that the lower portion of the pressure-receiving member 40 is connected to the right and left side frames 20.

According to the pressure-receiving member 40 as described above, when a backward movement load acts on the pressure-receiving member 40, the bent portions of the right and left ends of the upper connecting wire W1 deform and the right and left end portions of the lower connecting wire W2 move backward by the swinging motion of the link members 23, so that the pressure-receiving member 40 moves backward with respect to the right and left side frames 20. Each link member 23 includes a conventional mechanism using a tension coil spring (shown without a reference numeral) and is thereby configured to swing backward by the action of the backward movement load equal to or greater than a predetermined value.

Figure 4:
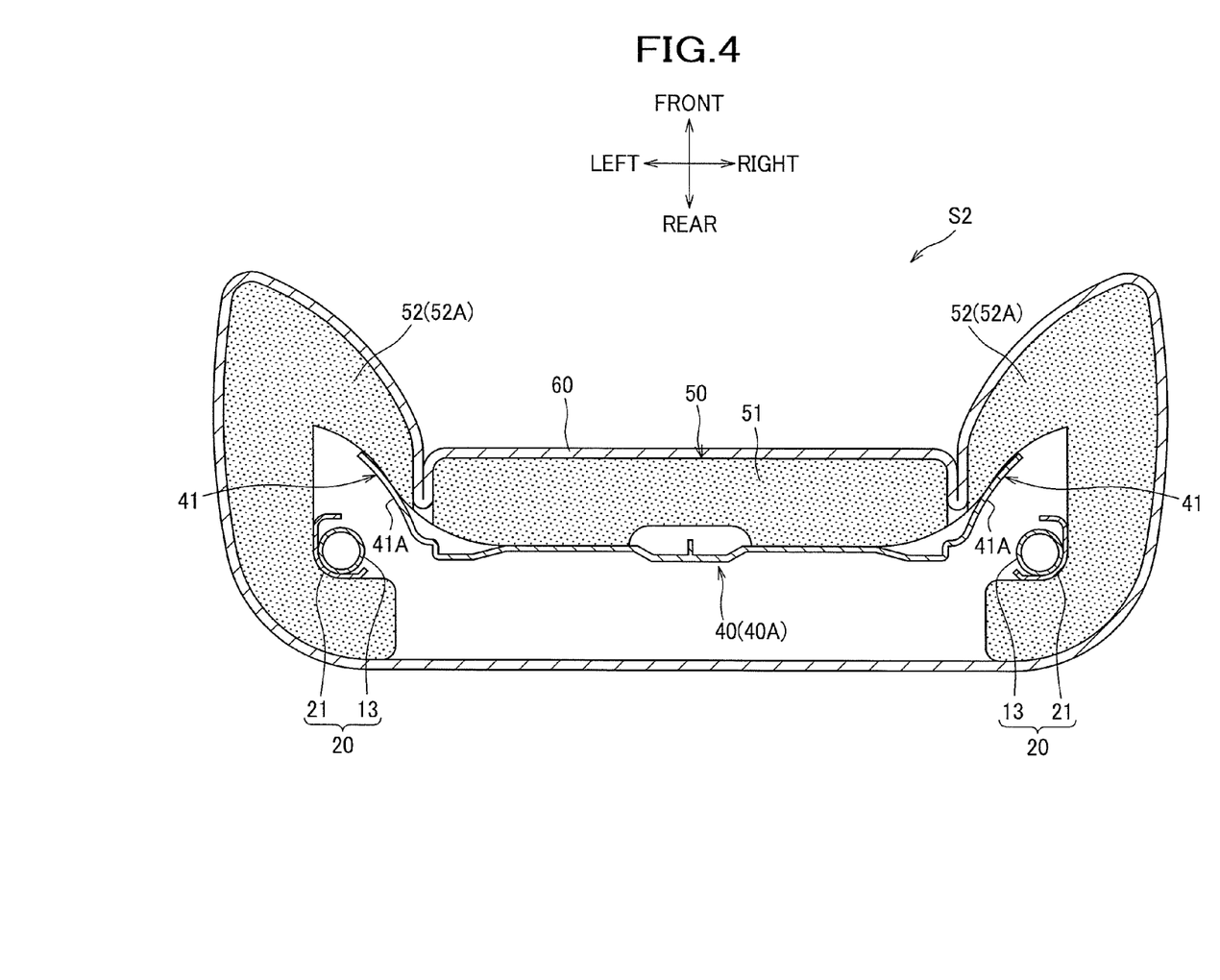
FIG. 4 is a sectional view taken along the line X-X of FIG. 3.

Support portions 41 as an example of support members are formed at both right and left sides of the upper portion of the pressure-receiving member 40. As seen in FIG. 4, the support portions 41 are integral with a pressure-receiving member main body portion 40A, which is disposed in the seat back S2 at a position opposite to the center portion 51 of the seat back pad 50, such that the support portions 41 extend in obliquely frontward and laterally outward directions from the upper portions of the right and left ends of the pressure-receiving member main body portion 40A, more specifically, from the both right and left ends of a portion of the pressure-receiving member main body portion 40A corresponding to the height of the chest region of the occupant. The support portions 41 extend to the vicinity of the front side of the right and left side frames 20; the support portions 41 are disposed frontward of the right and left side frames 20 with a gap provided between each of the side frames 20 and each of the support portions 41.

The support portion 41 curves along the peripheral surface of the vertical pipe portion 13, so that a recessed portion 41A as an example of a relief portion for preventing interference with the side frame 20 is formed at a position facing the side frame 20, that is, at the rear side. The support portion 41 is provided substantially at the position corresponding to the height of the vertical pipe portion 13 of the side frame 20.

The front surfaces of the support portions 41 are disposed in contact with the seat back pad 50 inside the seat back S2. When the occupant sits on the seat cushion S1 and leans back against the seat back S2, the seat back pad 50 deforms and the support portions 41 support the seat back pad 50 (upper side portions 52A) from inside the seat back S2. To describe further in detail, the support portions 41 are provided on the pressure-receiving member main body portion 40A so as to be elastically deformable in the front-rear directions; the support portions 41 have slightly deformed backward in the seat back S2 as they are being pushed by the seat back pad 50 from the front side thereof. Accordingly, the support portions 41 urge the seat back pad 50 (upper side portions 52A) in the frontward direction.

Figure 5:
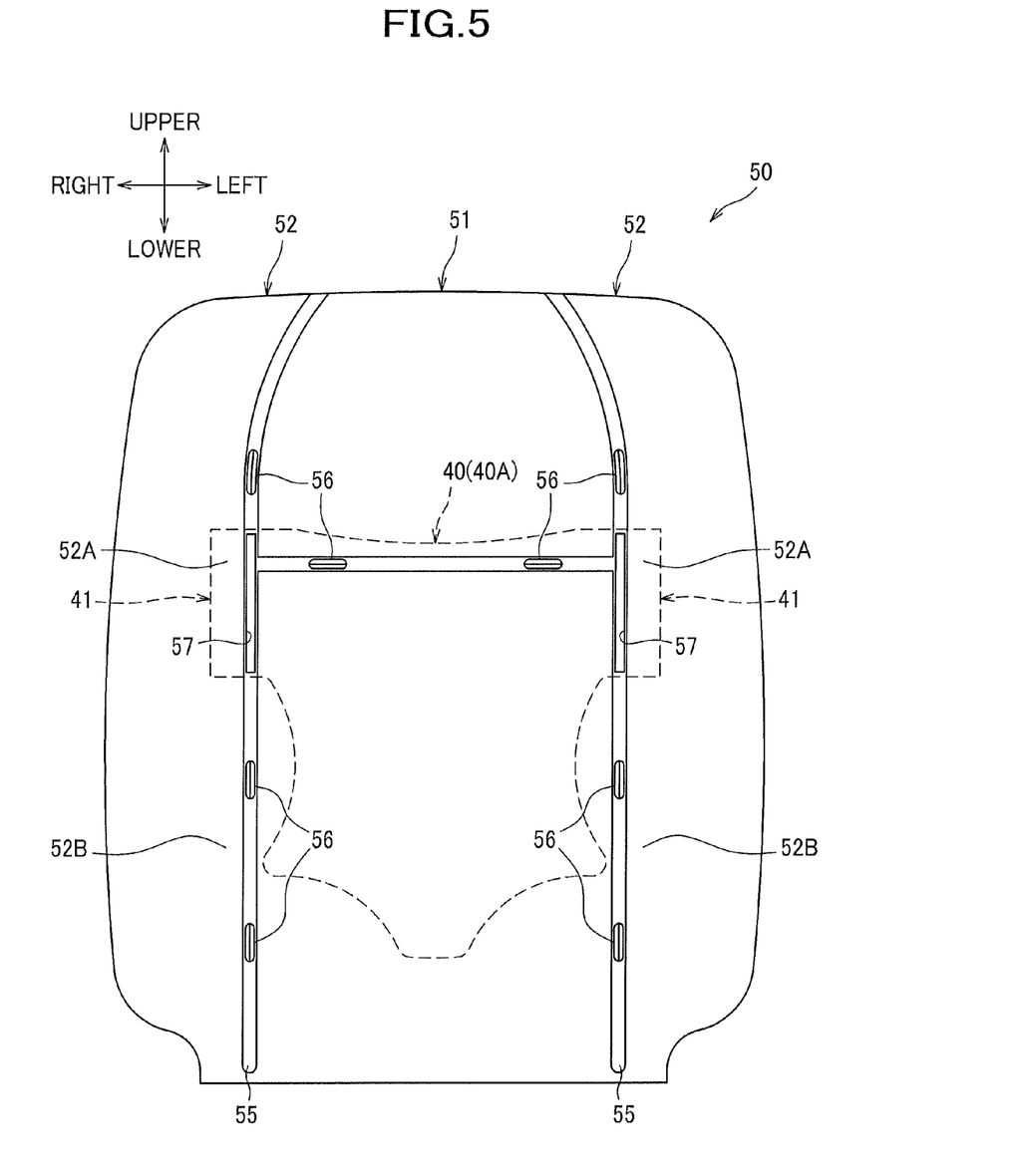
FIG. 5 is a front view of the seat back pad for covering the seat back frame.

As seen in FIGS. 4 and 5, the seat back pad 50 for covering the seat back frame F2 includes a center portion 51 configured to face the back region of the occupant's upper body, and right and left side portions 52 provided at right and left sides of the center portion 51 and each configured to protrude frontward farther than the center portion 51. In this embodiment, the frontwardly bulding shape of the right and left side portions 52 is retained mainly by the frontwardly protruding bulging portions 22 and the support portions 41.

As viewed from front, the seat back pad 50 is provided with a plurality of tucking grooves 56 for tucking the skin material 60, at the center portion 51 as well as at boundary regions 55 between the center portion 51 and the right and left side portions 52. Further, as viewed from front, the seat back pad 50 is provided with a pair of right and left slot holes 57 in the shape of elongated through-openings extending in the upper-lower direction at positions where the boundary regions 55 and the support portions 41 overlap each other.

Figure 6:
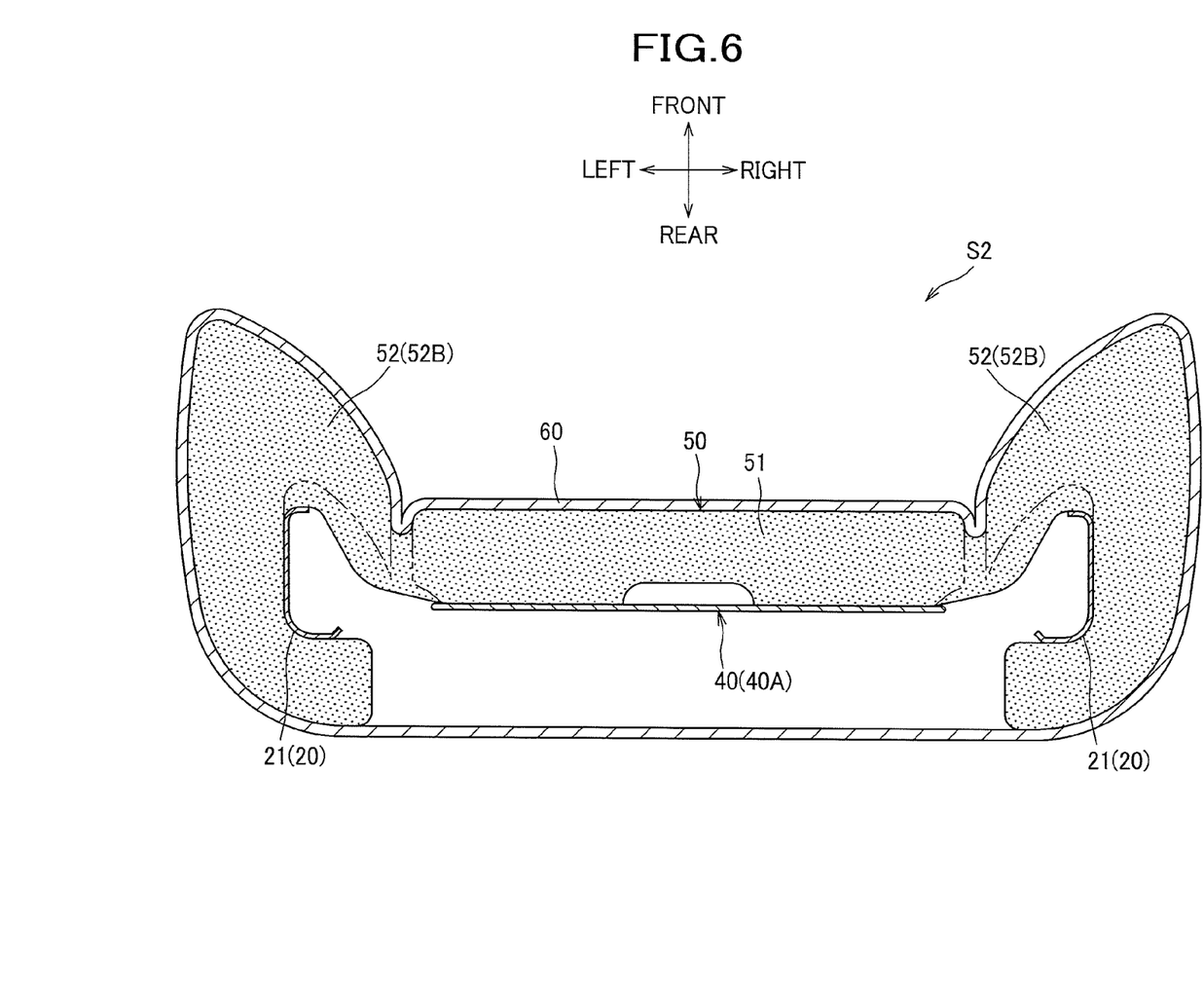
FIG. 6 is a sectional view taken along the Y-Y of FIG. 3.

As seen in FIG. 4 which is a sectional view of a portion of the seat back S2 corresponding to the height of the occupant's chest region, and FIG. 6 which is a sectional view of a portion corresponding to the occupant's lumbar region, in the right and left side portions 52 of the seat back pad 50, portions closer to the center portion 51 are configured such that the upper side portions 52A corresponding to the height of the occupant's chest region are thinner in the front-rear direction than the lower side portions 52B corresponding to the height of the occupant's lumbar region. To make it easier to understand that the upper side portions 52A become thinner in the front-rear direction than the lower side portion 52B, FIG. 6 shows contours of the rear sides of the upper side portions 52A by chain double-dashed lines.

Next, operation and advantageous effects of the car seat S configured as described above will be described.

Figure 7:
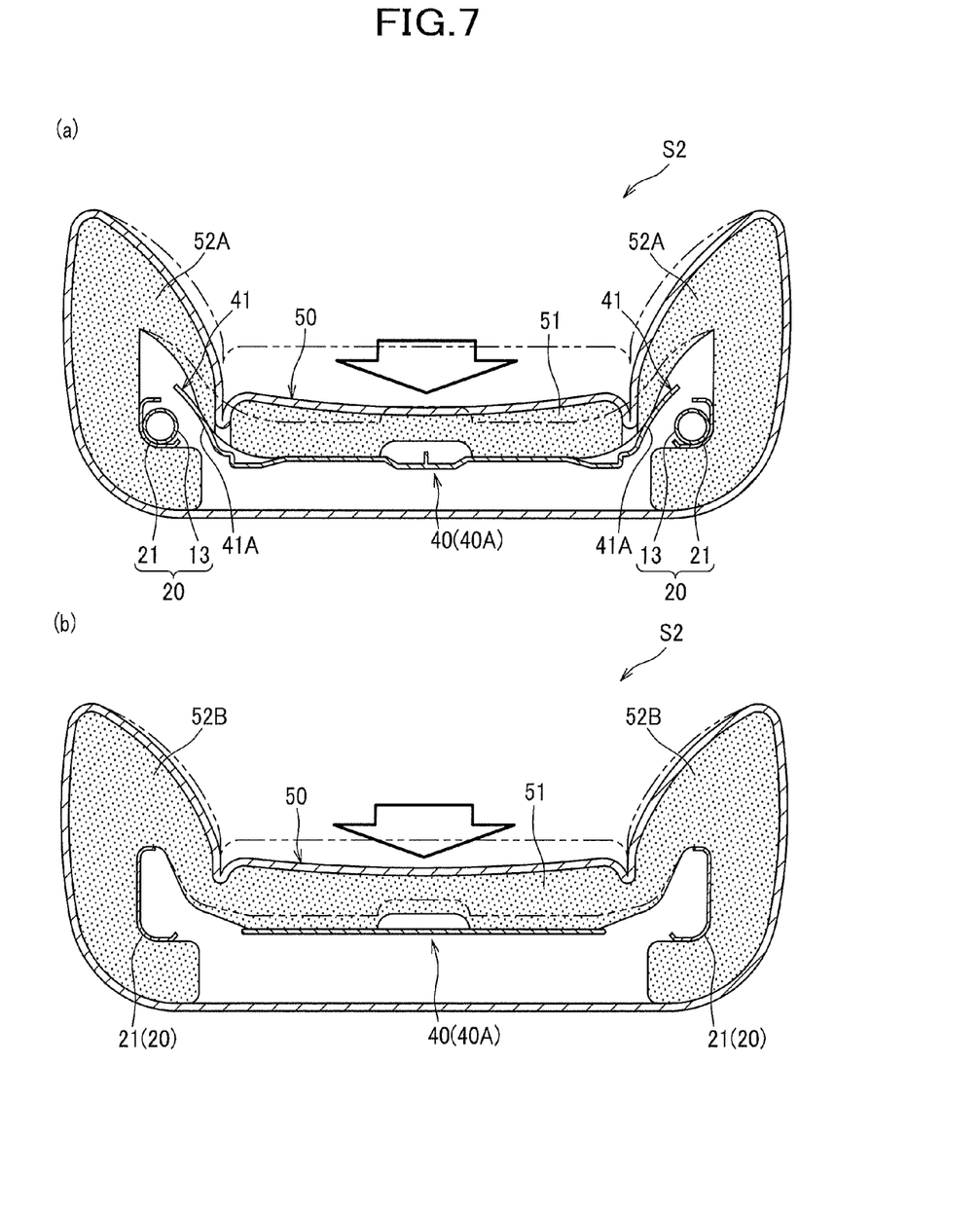
FIG. 7 includes sectional views of the seat back when a backward movement load acts on the seat back, in which (a) shows portions corresponding to the height of the chest region of an occupant, and (b) shows portions corresponding to the height of the lumbar region of the occupant.

When a backward movement load acts on the seat back S2 from the occupant as a result of a rear-end collision such as in the cases where the car is rear-ended by another car and the car collides at its rear portion with another vehicle, as seen in FIGS. 7(a) and 7(b), the seat back pad 50 deforms and moves backward from the position indicated by chain double-dashed lines at which no load is input, and at the same time, the pressure-receiving member 40 is pushed by the seat back pad 50 and moves backward.

During this movement, since the upper side portions 52A of the seat back pad 50 as shown in FIG. 7(a) are thinner in the front-rear direction and thus more easily deformable than the lower side portions 52B, when the backward movement load is input, the upper side portions 52A deform faster and greater than the lower side portions 52B as shown in FIG. 7(b). Accordingly, the upper part of the occupant's upper body (i.e., portion corresponding to the height of the occupant's chest region) sinks into the seat back pad 50 faster and deeper than the lower part of the occupant's upper body (i.e., portion corresponding to the height of the occupant's lumbar region).

In other words, according to the car seat S, each of the right and left side portions 52 has the upper side portion 52A which is configured to be more easily deformable than the lower side portion 52B when they receive a backward movement load, so that when the backward movement load acts on the seat back S2, it is ensured that the upper part of the occupant's upper body can sink sufficiently into the seat back. Consequently, the head near the upper part of the occupant's upper body can quickly move closer to the headrest S3, with the result that the impact applied to the neck by the rear-end collision can be reduced further.

Further, since the car seat S includes the support portions 41 provided to support the upper side portions 52A from inside the seat back S2 and configured to be movable in the backward direction, the support portions 41 can stably support the occupant in the normal condition as compared to the configuration in which only the seat back pad 50 is provided (without the support portions 41), and once the backward movement load acts on the seat back S2, the support portions 41 can move backward to ensure that the upper part of the occupant's upper body can sink sufficiently into the seat back S2.

More particularly, in this embodiment, since the front surfaces of the support portions 41 are disposed in contact with the seat back pad 50, the occupant can be more stably supported in the normal condition. It is to be noted that if the front surfaces of the support portions 41 are disposed in contact with the seat back pad 50, irrespective of the occupant's physique, the load can be stably transmitted from the seat back pad 50 (upper side portions 52A) to the support portions 41 when the backward movement load is received. In contrast, if the support portions 41 are positioned away from the seat back pad 50, the contact positions between the seat back pad 50 and the support portions 41 may be changed in accordance with the occupant's physique and other conditions when the backward movement load is received. This may cause the load to be unstably transmitted from the seat back pad 50 to the support portions 41, and is therefore undesirable.

Further, in this embodiment, as seen in FIG. 3, since the upper connecting wire W1, the portions (engagement portions 45) connecting the upper connecting wire W1 and the pressure-receiving member 40, and the portions (supporting tabs 14) connecting the upper connecting wire W1 and the right and left side frames 20 are provided at the same height position as that of the support portions 41, the support portions 41 can be stably supported from behind by the upper connecting wire W1. This can improve the occupant supporting performance of the support portions 41 in the normal condition.

Further, as seen in FIG. 4, since the support portions 41 are disposed frontward of the right and left side frames 20 with a gap provided between each of the side frames 20 and each of the support portions 41, there is a sufficient space for allowing the seat back pad 50 to deform when the upper side portions 52A (seat back pad 50) deform by the action of the backward movement load. Accordingly, the seat back pad can deform further by the action of the backward movement load.

Further, since each support portion 41 has a recessed portion 41A, which is recessed frontward, at a position facing the side frame 20, when the seat back pad 50 deforms by the action of the backward movement load, interference of the support portions 41 with the side frames 20 can be prevented. Further, an occurrence of interference noise can be prevented because of the restriction of the interference. In this embodiment, since the side frames 20 have portions facing the support portions 41, which are substantially made of cylinder-shaped vertical pipe portions 13, the side frames 20 are less subject to interference with the support portions 41.

Further, the support portions 41 as an example of the support members are integrally formed with the pressure-receiving member 40 (pressure-receiving member main body portion 40A), which can simplify the configuration of the car seat S and prevent an increase in the number of parts. It is to be noted that since the support portions 41 extend obliquely frontward from the both right and left ends of the pressure-receiving member main body portion 40A, the pressure-receiving member 40 has a substantially U-shaped cross section. This can improve the rigidity of the pressure-receiving member 40 as a whole, and thus improve the occupant supporting performance of the support portions 41 in the normal condition.

As far as the number of parts is concerned, according to this embodiment, since the frontwardly protruding bulging portions 22 and the support portions 41 maintain the frontwardly extending shapes of the right and left side portions 52, the number of parts can be reduced as compared to the configuration in which bent wires for connecting upper portions of the side frames 20 and the bulging portions 22 are provided to maintain the shapes of the right and left side portions 52.

Further, as seen in FIG. 5, since the seat back pad 50 has slot holes 57 at positions where the boundary regions 55 and the support portions 41 overlap each other, the upper side portions 52A are more easily deformable. Accordingly, the upper part of the occupant's upper body sinks more sufficiently into the seat back by the action of the backward movement load.

Further, since the support portions 41 are configured to urge the upper side portions 52A in the frontward direction, it is possible to stably support the occupant in the normal condition as well as to prevent a gap which would otherwise be formed between the support portions 41 and the seat back pad 50 due to manufacturing error. Further, it is possible to cause the support portions 41 to quickly deform in accordance with the deformation of the seat back pad 50 when the backward movement load acts on the seat back and, more specifically, in accordance with the backward movement associated with deformation as made by the input of the backward movement load as well as the recovery to the original shape after removing the input of the load.

Although one embodiment of the present invention has been described, the present invention is not limited to the above specific embodiment. It is to be understood that modifications and changes may be made to any of the specific configurations where necessary without departing from the scope of the present invention.

Figure 8:
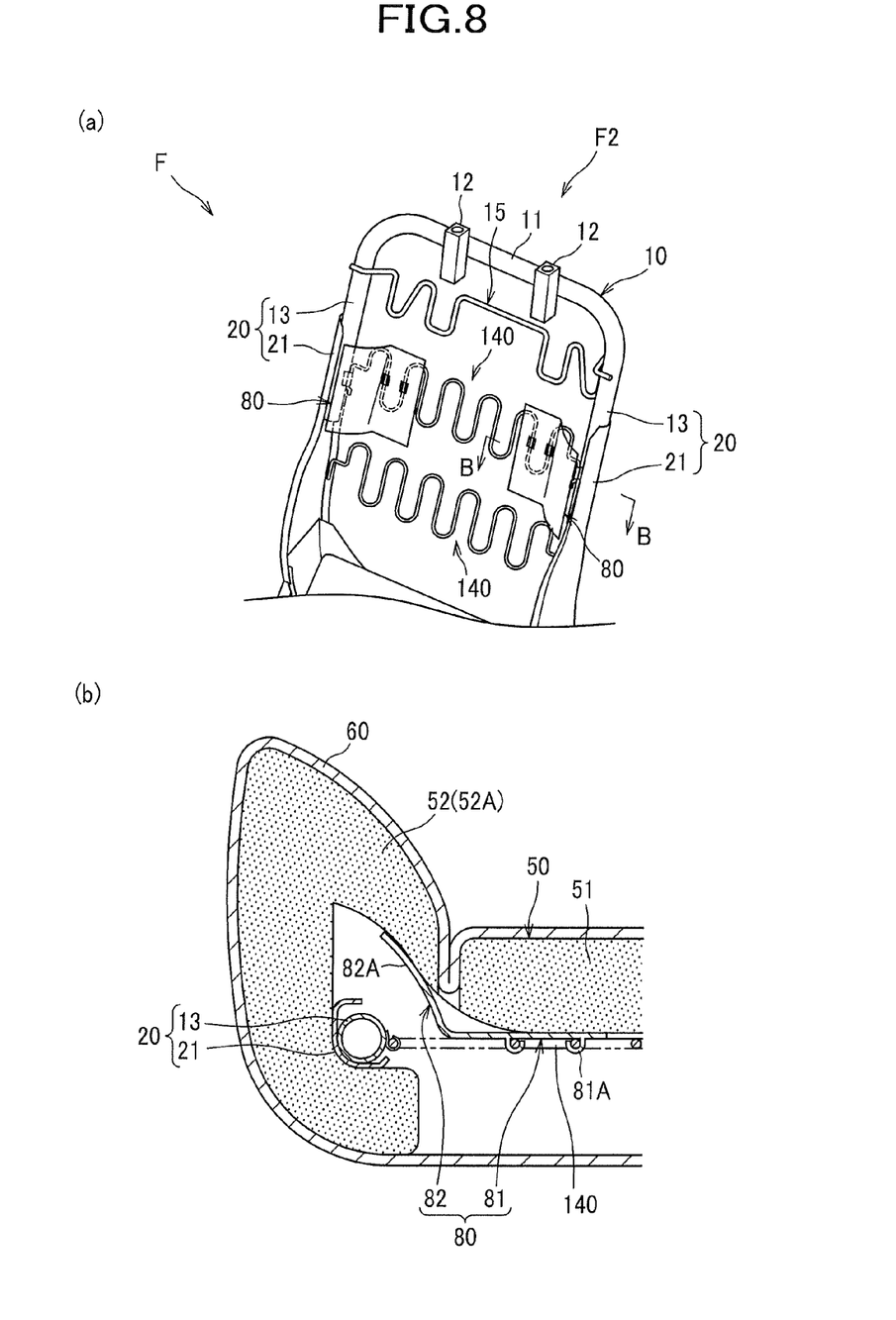
FIG. 8 includes a perspective view (a) of a car seat according to the first modification, and a sectional view (b) taken along the line B-B of FIG. 8(a).

In the above embodiment, the support portions 41 as an example of the support members are integrally formed with the pressure-receiving member 40 (pressure-receiving member main body portion 40A). However, the present invention is not limited to this configuration; for example, the support members may be discrete members (discrete parts) formed separately from the pressure-receiving member. Further, the present invention may not comprise a plate-like pressure-receiving member. For example, as seen in FIG. 8(a), in place of the pressure-receiving member, the car seat may include seat springs 140 provided between the right and left side frames 20 under tension. According to this car seat, when a backward movement load acts on the seat back from the occupant as a result of a rear-end collision, the seat back pad 50 deforms and moves backward, and then the seat springs 140 are pushed by the seat back pad 50 and deform backward, so that the upper body of the occupant can sink into the seat back.

The car seat shown in FIGS. 8(a) and 8(b) includes a pair of right and left support members 80 in place of the pair of support portions 41 described in the above embodiment. Like the support portions 41, the support members 80 support the upper side portions 52A from inside the seat back, and are provided inside the seat back. As seen in FIG. 8(b), each of the support members 80 is formed as a plate-like member having a V-shape configuration as seen from top, and includes an attachment portion 81 extending in the right-left direction of the figure, and a support portion 82 extending in an obliquely frontward and outward direction from the right end portion or the left end portion of the attachment portion 81.

A clip portion 81A is formed at the rear surface of the attachment portion 81; the support portion 80 is attached to the seat spring 140 via the clip portion 81A engagable with o the seat spring 140. With this configuration, the support members 80 are movable in the backward direction with respect to the right and left side frames 20 because the seat springs 140 are deformable in the backward direction.

Like the support portions 41 in the above embodiment, the support portions 82 extend to the vicinity of the front side of the right and left side frames 20; the support portions 82 are disposed frontward of the right and left side frames 20 with a gap provided between each of the side frames 20 and each of the support portions 82. Each support portion 82 curves along the peripheral surface of the vertical pipe portion 13, so that a recessed portion 82A (relief portion) for preventing interference with the side frame 20 is formed at the rear side. Further, the support portions 82 are provided on the attachment portion 81 so as to be elastically deformable in the front-rear directions; the support portions 82 are arranged such that the front surfaces thereof are in contact with the inner surface of the seat back pad 50 (upper side portions 52A) so as to urge the upper side portions 52A in the frontward direction.

The support members 80 as described above can provide the same operation and advantageous effects as those of the support portions 41 in the above embodiment.

Figure 9:
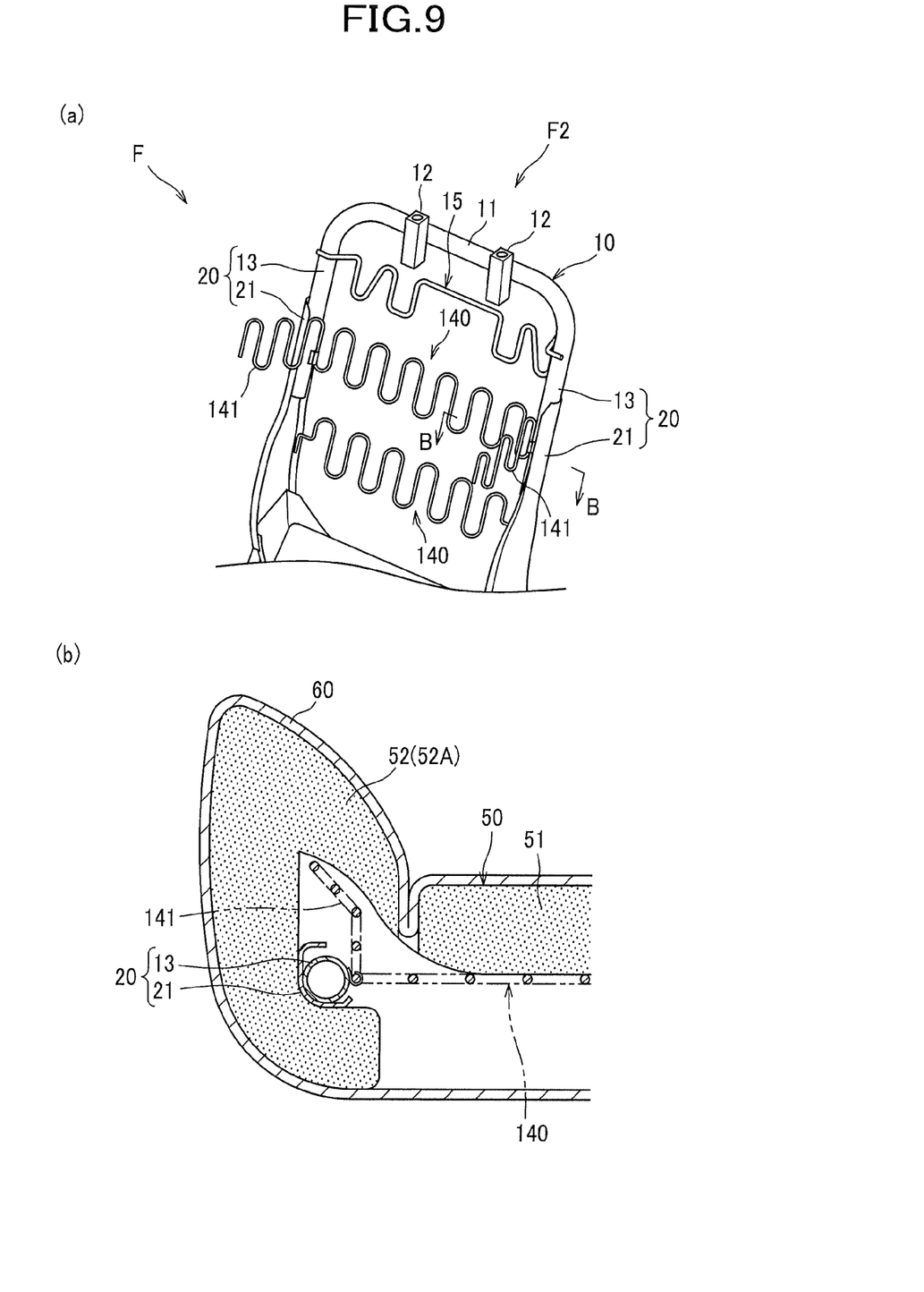
FIG. 9 includes a perspective view (a) of a car seat according to the second modification, and a sectional view (b) taken along the line B-B of FIG. 9(a).

According to the above-described embodiment and the modified embodiment described in FIG. 8, the support members (support portions 41 and the support members 80) are formed into plate-like members; however, the present invention is not limited to this specific configuration. For example, the support members may be integral with the seat spring which is provided and pulled under tension at a position corresponding to the height of the occupant's chest region. To be more specific, as seen in FIGS. 9(a) and 9(b), these support members (support portions 141) can be formed by bending the both right and left end portions of the upper seat spring 140 in obliquely frontward and laterally outward directions. In the normal condition, the support portions 141 are in contact with the upper side portions 52A from behind to support the upper side portions 52A (occupant) from inside the seat back, and when a backward movement load acts on the seat back, the support portions 141 are pushed by the upper side portions 52A which is deforming and moving backward, and thus move backward to ensure that the upper part of the occupant's upper body can sink sufficiently into the seat back.

It is to be noted that as long as the occupant can be stably supported by the seat back pad or the like, the car seat according to the present invention may not include the support members.

In the above embodiment, the upper side portions 52A can be urged frontward because the support portions 41 (support members) are provided on the pressure-receiving member main body portion 40A so as to be elastically deformable in the front-rear directions. However, the present invention is not limited to this specific configuration. For example, the upper side portions can be urged frontward using plate-like support members arranged inside (at the rear of) the upper side portions; the support members are urged frontward using springs or a cushion material disposed at the rear of the support members. The present invention, however, may be configured such that the support members do not urge the upper side portions in the frontward direction.

In the above embodiment, each support portion 41 (support member) curves along the peripheral surface of the vertical pipe portion 13, so that a recessed portion 41A as an example of a relief portion is formed at a position facing the side frame 20. However, the present invention is not limited to this specific configuration. For example, the relief portion may be a through-hole formed in the support member, or a recessed portion formed on a substantially straight plate-like support member at its surface facing the side frame.

In the above embodiment, the seat back pad 50 has slot holes 57 (through-openings) at positions where the boundary regions 55 (between the center portion 51 and the right and left side portions 52) and the support portions 41 overlap each other. However, the present invention is not limited to this specific configuration. For example, in place of the through-holes, recessed portion (grooves) may be provided at positions where the boundary regions 55 of the seat back pad 50 and the support portions 41 overlap each other. This configuration also makes the upper side portions more easily deformable, so that the upper part of the occupant's upper body can sink sufficiently into the seat back by the action of the backward movement load. The above through-holes and the recessed potions for softening the upper side portions may be holes or grooves for tucking the skin material.

In the above embodiment, the upper side portions 52A are thinner in the front-rear direction than the lower side portions 52B, with the result that the right and left side portions 52 of the seat back pad 50 are configured such that the upper side portions 52A are more easily deformable than the lower side portions 52B when they receive a backward movement load. However, the present invention is not limited to this specific configuration. For example, the upper side portions may have through-holes or recessed portions so that the upper side portions are more easily deformable than the lower side portions when they receive the backward movement load. As an alternative, the entire seat back pad or the right and left side portions may be configured such that the cushion material for the upper portion corresponding to the height of the occupant's chest region is softer than the cushion material for the lower portion corresponding to the height of the occupant's lumbar region; this configuration makes the upper side portions more easily deformable than the lower side portions when they receive the backward movement load.

In the above embodiment, wire-like members (upper connecting wire W1 and lower connecting wire W2) are used as an example of a connecting member for connecting the pressure-receiving member 40 to the right and left side frames 20. However, the present invention is not limited to this specific configuration. For example, the connecting member may be coil spring-like members or a belt-like (band-like) member.

In the above embodiment, the specific configuration of the seat frame F (seat cushion frame F1 and seat back frame F2) is described as an example; the present invention is not limited to this configuration shown in the above embodiment. For example, in the above embodiment, each right and left side frame 20 of the seat back frame F2 consists of the pipe-shaped vertical pipe portion 13 and the plate-like side frame main body portion 21. However, the present invention is not limited to this configuration. Each side frame may consist of the pipe-shaped frame only or the plate-like frame only.

In the above embodiment, the car seat S used in a car is illustrated as an example of a vehicle seat. However, the present invention is not limited to the car seat and applicable to other vehicle seat, such as a seat for marine vessel and a seat for aircraft.

The invention claimed is:

1. A vehicle seat comprising a seat cushion, a seat back, and a headrest, the seat back including a seat back frame constituting a frame of the seat back, and a seat back pad covering the seat back frame, and the vehicle seat being configured to allow an upper body of an occupant to sink into the seat back when a backward movement load acts on the seat back from the occupant's upper body, wherein the seat back pad comprising a center portion configured to face a back region of the occupant's upper body, and right and left side portions provided at right and left sides of the center portion and each configured to protrude frontward farther than the center portion, said seat back pad having through-openings or recessed portions at positions where regions between the center portion and the right and left side portions overlap the support members, wherein each of the right and left side portions has an upper side portion corresponding to a height of a chest region of the occupant and a lower side portion corresponding to a height of a lumbar region of the occupant, which are configured such that when they receive the backward movement load, the upper side portion is more easily deformable than the lower side portion, wherein the vehicle seat further comprises support members provided in the seat back and configured to support the upper side portions from inside the seat back and to be movable in a backward direction, and wherein the support members are disposed frontward of right and left side frames of the seat back frame with a gap provided between each of the side frames and each of the support members.

2. The vehicle seat according to claim 1, wherein each support member has a relief portion for preventing interference with the side frame, at a position facing the side frame.

3. The vehicle seat according to claim 1, wherein the right and left side frames comprise right and left vertical pipe portions extending in an upper-lower direction, and wherein each of the support members curves along a peripheral surface of a corresponding vertical pipe portion to provide a recessed portion for preventing interference with the side frame at a position facing the side frame.

4. The vehicle seat according to claim 1, wherein the right and left side frames comprise right and left vertical pipe portions extending in an upper-lower direction at positions corresponding to a height position of the support members, and wherein each of the support members has a relief portion for preventing interference with a corresponding vertical pipe portion.

5. The vehicle seat according to claim 1, wherein front surfaces of the support members are disposed in contact with the seat back pad.

6. The vehicle seat according to claim 5, wherein the support members are configured to urge the upper side portions in a frontward direction.

7. The vehicle seat according to claim 1, further comprising a pressure-receiving member disposed in the seat back at a position facing the center portion and connected to the right and left side frames of the seat back frame via a connecting member so as to allow the pressure-receiving member to move backward, wherein the support members are integrally formed with the pressure-receiving member such that they extend outward in a right-left direction from upper portions of right and left ends of the pressure-receiving member.

* * * * *